US008553589B2

(12) United States Patent
Hui et al.

(10) Patent No.: US 8,553,589 B2
(45) Date of Patent: Oct. 8, 2013

(54) DUAL MODE RADIO FOR FREQUENCY DIVISION DUPLEXING AND TIME DIVISION DUPLEXING COMMUNICATION MODES

(75) Inventors: Yan Hui, San Diego, CA (US); Hanson On, San Diego, CA (US); Edwin Park, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 326 days.

(21) Appl. No.: 12/777,945

(22) Filed: May 11, 2010

(65) Prior Publication Data

US 2010/0290369 A1 Nov. 18, 2010

Related U.S. Application Data

(60) Provisional application No. 61/177,532, filed on May 12, 2009.

(51) Int. Cl.
*H04B 7/14* (2006.01)
(52) U.S. Cl.
USPC .......................................................... 370/279
(58) Field of Classification Search
USPC ......... 370/203, 204–215, 229–240, 310–394, 370/395.1, 395.3, 395.4, 395.41, 395.42, 370/395.5, 395.52, 395.53, 412–421, 431–529
See application file for complete search history.

(56) References Cited

U.S. PATENT DOCUMENTS

| | | | | |
|---|---|---|---|---|
| 5,881,369 | A | * | 3/1999 | Dean et al. ................... 455/78 |
| 7,359,734 | B2 | * | 4/2008 | Ylitalo ...................... 455/562.1 |
| 7,397,818 | B2 | * | 7/2008 | Restivo et al. ................ 370/468 |
| 7,636,554 | B2 | * | 12/2009 | Sugar et al. ................... 455/73 |
| 2007/0109962 | A1 | * | 5/2007 | Leng et al. .................... 370/229 |
| 2007/0253466 | A1 | | 11/2007 | Jones et al. |
| 2008/0207151 | A1 | | 8/2008 | Rinne et al. |
| 2008/0285488 | A1 | * | 11/2008 | Walton et al. ................. 370/280 |
| 2009/0046671 | A1 | | 2/2009 | Luo |
| 2009/0059820 | A1 | * | 3/2009 | Jung et al. ..................... 370/280 |
| 2010/0135272 | A1 | * | 6/2010 | Dayal et al. .................. 370/343 |
| 2010/0231472 | A1 | * | 9/2010 | Tran ............................. 343/742 |
| 2011/0274014 | A1 | * | 11/2011 | Du et al. ...................... 370/278 |

FOREIGN PATENT DOCUMENTS

WO WO 2008/127184 10/2008

* cited by examiner

*Primary Examiner* — Jung-Jen Liu
(74) *Attorney, Agent, or Firm* — Van Pelt, Yi & James LLP

(57) ABSTRACT

Dual mode radio for frequency division duplexing and time division duplexing communication modes. In some embodiments, dual mode radio for frequency division duplexing and time division duplexing communication modes includes a multi-mode communication unit for wireless communication, in which the multi-mode communication unit allocates access for a time based communication mode and a frequency based communication mode; and a processor configured to implement at least in part the multi-mode communication unit. In some embodiments, the time based communication mode includes a time division duplexing (TDD) communication mode, and the frequency based communication mode includes a frequency division duplexing (FDD) communication mode.

31 Claims, 18 Drawing Sheets

(a)

(b)

(c)

(a)

(b)

| Uplink-downlink configuration | Downlink-to-Uplink Switch-point periodicity | Subframe number ||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Note: D = Downlink; U = Uplink; S = special frame.

FIG. 16

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | FDD-DL | U | D | S | U | FDD-DL | U |
| 1 | 5 ms | D | S | U | U | D | D | S | U | U | D |
| 2 | 5 ms | D | S | U | D | FDD-DL | D | S | U | D | FDD-DL |
| 3 | 10 ms | D | S | U | U | U | D | FDD-DL | FDD-DL | D | D |
| 4 | 10 ms | D | S | U | U | FDD-DL | D | FDD-DL | FDD-DL | D | D |
| 5 | 10 ms | D | S | U | FDD-DL | FDD-DL | FDD-DL | FDD-DL | FDD-DL | D | FDD-DL |
| 6 | 5 ms | D | S | U | U | U | D | S | U | U | D |

FIG. 17

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | FDD-UL or U | U | D | S | U | FDD-UL or U | U |
| 1 | 5 ms | D | S | U | U | D | D | S | U | U | D |
| 2 | 5 ms | D | S | U | D | FDD-UL or D | D | S | U | D | FDD-UL or D |
| 3 | 10 ms | D | S | U | U | U | D | FDD-UL or D | FDD-UL or D | D | D |
| 4 | 10 ms | D | S | U | U | FDD-UL or D | D | FDD-UL or D | FDD-UL or D | D | D |
| 5 | 10 ms | D | S | U | FDD-UL or D | FDD-UL or D | FDD-UL or D | FDD-UL or D | FDD-UL or D | D | D |
| 6 | 5 ms | D | S | U | U | U | D | S | U | U | FDD-UL |
| | | D | S | U | U | | D | | | U | D |

FIG. 18

DUAL MODE RADIO FOR FREQUENCY DIVISION DUPLEXING AND TIME DIVISION DUPLEXING COMMUNICATION MODES

CROSS REFERENCE TO OTHER APPLICATIONS

This application claims priority to U.S. Provisional Patent Application No. 61/177,532 entitled SYSTEM AND METHOD FOR OFDM BASED FDD/TDD DUAL MODE RADIO, DEPLOYMENT AND OPERATION filed May 12, 2009, which is incorporated herein by reference for all purposes.

BACKGROUND OF THE INVENTION

Some wireless air interface standards have two multiplexing communication modes, Frequency Division Duplexing (FDD) and Time Division Duplexing (TDD). Long Term Evolution (LTE), also known as 3GPP UMTS release 8 and release 9, is an example wireless communication standard that supports both TDD and FDD communication modes.

BRIEF DESCRIPTION OF THE DRAWINGS

Various embodiments of the invention are disclosed in the following detailed description and the accompanying drawings.

FIG. 16 provides a table of uplink-downlink configurations for LTE TDD frame structure defined in the 3GPP standard.

FIG. 17 provides a table of examples of transmitting a FDD-DL subframe in a TDD configuration in accordance with some embodiments.

FIG. 18 provides a table of examples of transmitting a FDD-UL subframe in a TDD configuration in accordance with some embodiments.

DETAILED DESCRIPTION

Figure 1:
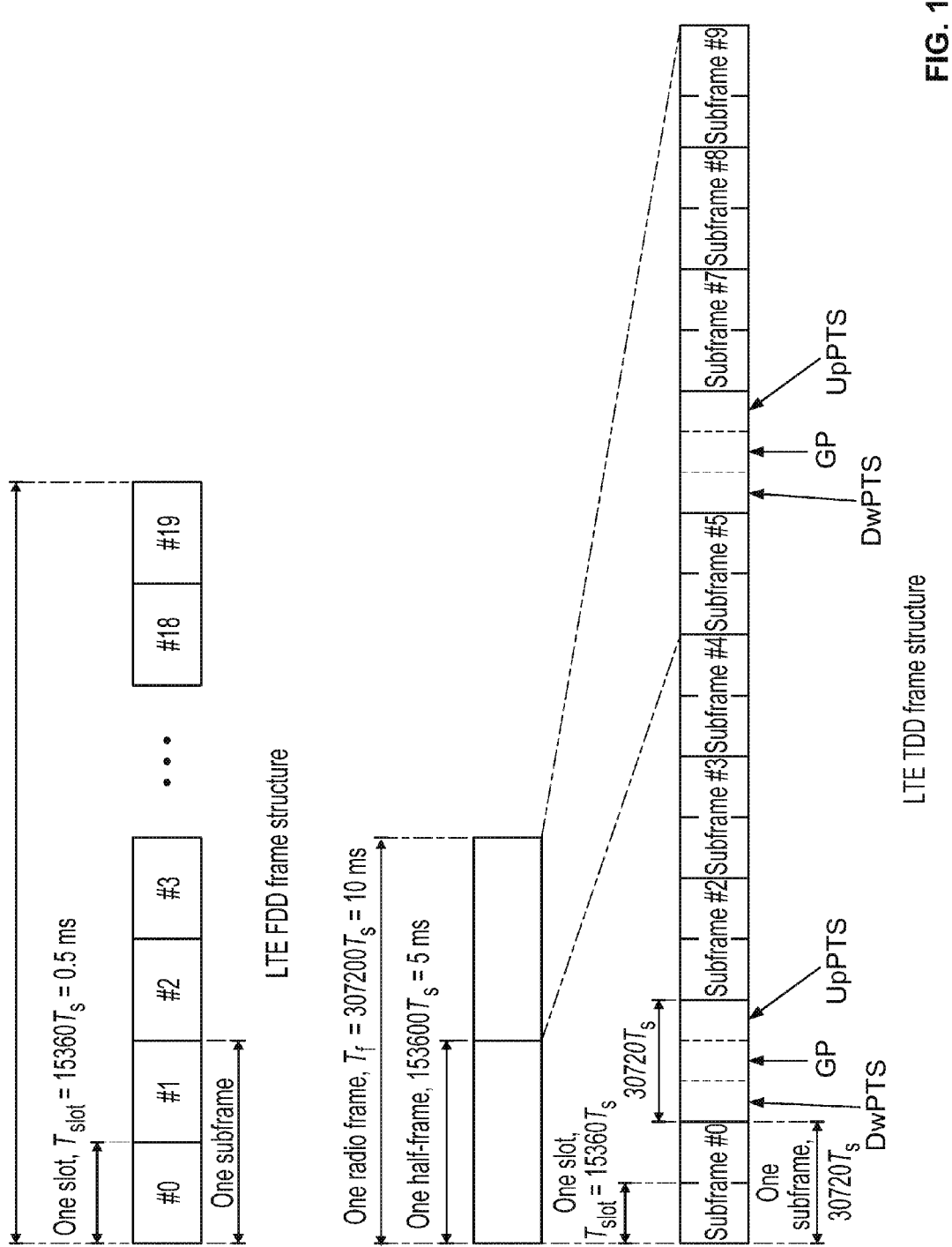
FIG. 1 provides an illustration of an LTE FDD and TDD frame structure as an example of an air interface with FDD and TDD modes.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some wireless standards (e.g., wireless air interface standards) have two multiplexing communication modes, Frequency Division Duplexing (FDD) and Time Division Duplexing (TDD). For example, the 3GPP Long Term Evolution (LTE) standard (e.g., 3GPP Releases 8, 9, and beyond), have TDD and FDD communication modes.

In practice, FDD and TDD radio and deployment have typically been implemented independently and separately. For example, a common approach has been to reuse a subset of isolated components or modules in the implementation of digital or analog radio.

What is needed are techniques for providing FDD and TDD communication modes simultaneously in one system, for example, one cell site or access point, and for providing a dual mode radio that can support the simultaneous deployment in a performance efficient and cost effective manner.

Accordingly, various techniques for providing a dual mode radio for frequency division duplexing and time division duplexing communication modes are provided. In some embodiments, dual mode radio for frequency division duplexing and time division duplexing communication modes addresses how to deploy TDD and FDD modes simultaneously in one system, and how to implement the dual mode radio that can satisfy the simultaneous deployment and perform in an efficient and cost effective manner. In some embodiments, various techniques disclosed herein pertain to wireless communications, for example, related to multi-mode devices, such as Base Stations (BTS), Access Points (AP), Relay Stations (RS) or Remote Stations, with different air interfaces, functionality, and/or configurations.

In some embodiments, dual mode radio for frequency based communication and time based communication modes includes a multi-mode communication unit for wireless communication, in which the multi-mode communication unit allocates access for a time based communication mode and a frequency based communication mode; and a processor configured to implement at least in part the multi-mode communication unit. In some embodiments, the time based communication mode includes a time division duplexing (TDD) communication mode, and the frequency based communication mode includes a frequency division duplexing (FDD) communication mode.

In some embodiments, the multi-mode communication unit allocates access for communication by operating a TDD Downlink (TDD DL) communication mode and a TDD Uplink (TDD UL) communication mode in an FDD Downlink (FDD DL) carrier frequency using a first carrier frequency for FDD DL and TDD DL/UL, and using a second carrier frequency for FDD Uplink (FDD UL) (e.g., within the first carrier frequency using a TDM frame structure to separate FDD DL communications from TDD DL and TDD UL communications; or within the first carrier frequency, using different sub-carrier groups for simultaneously transmitting FDD DL and TDD DL communications).

In some embodiments, the multi-mode communication unit allocates access for communication by operating a TDD Downlink (TDD DL) communication mode and a TDD Uplink (TDD UL) communication mode in an FDD Uplink (FDD UL) carrier frequency using a first carrier frequency for FDD UL and TDD DL/UL, and using a second carrier frequency for FDD Downlink (FDD DL) (e.g., within the first carrier frequency using a TDM frame structure to separate FDD UL communications from TDD DL and TDD UL communications; or within the first carrier frequency, using different sub-carrier groups for simultaneously transmitting FDD UL and TDD UL communications).

In some embodiments, the multi-mode communication unit further includes a dual mode radio in communication with the multi-mode communication unit, in which the dual mode radio communicates using the time based communication mode and the frequency based communication mode.

In some embodiments, the dual mode radio for frequency based communication and time based communication modes further includes a first RF/analog front end, in which the multi-mode communication using the time based communication mode is provided at least in part using the first RF/analog front end; and a second RF/analog front end, in which the multi-mode communication using the frequency based communication mode is provided at least in part using the second RF/analog front end.

In some embodiments, the dual mode radio for frequency based communication and time based communication modes further includes a shared RF/analog front end transmitter, in which the multi-mode communication for the frequency based communication mode and the time based communication mode is transmitted using at least in part the shared RF/analog front end transmitter.

In some embodiments, the dual mode radio for frequency based communication and time based communication modes further includes a first RF/analog front end receiver, wherein the multi-mode communication for the time based communication mode is received using at least in part the first RF/analog front end; a second RF/analog front end receiver, wherein the multi-mode communication for the frequency based communication mode is received using at least in part the second RF/analog front end; and a shared RF/analog front end transmitter, wherein the multi-mode communication for the frequency based communication mode and the time based communication mode is transmitted using at least in part the shared RF/analog front end transmitter.

In some embodiments, the dual mode radio for frequency based communication and time based communication modes further includes a first RF/analog front end receiver, in which the multi-mode communication for the time based communication mode is received using at least in part the first RF/analog front end receiver; a second RF/analog front end receiver, in which the multi-mode communication for the frequency based communication mode is received using at least in part the second RF/analog front end receiver; a first RF/analog front end transmitter, in which the multi-mode communication for the time based communication mode is transmitted using at least in part the first RF/analog front end transmitter; and a second RF/analog front end transmitter, in which the multi-mode communication for the frequency based communication mode is transmitted using at least in part the second RF/analog front end transmitter; in which the frequency based communication mode includes a frequency based uplink communication mode and a frequency based downlink communication mode, and the time based communication mode and the frequency based uplink communication mode share a common carrier frequency and are communicated using a time division multiplexing (TDM) frame structure.

In some embodiments, the dual mode radio for frequency based communication and time based communication modes further includes a tunable receiver in communication with the multi-mode communication unit, in which the multi-mode communication for the frequency based communication mode and the time based communication mode is received using at least in part the tunable receiver; and a tunable transmitter in communication with the multi-mode communication unit, in which the multi-mode communication for the frequency based communication mode and the time based communication mode is transmitted using at least in part the tunable transmitter. In some embodiments, the tunable transmitter is tunable to a first frequency and a second frequency.

In some embodiments, the dual mode radio for frequency based communication and time based communication modes further includes an antenna in communication with the multi-mode communication unit, in which the multi-mode communication is provided at least in part using the antenna, in which the antenna is shared for providing the multi-mode communication using the frequency based communication mode and the time based communication mode.

In some embodiments, the multi-mode communication unit allocates access for communication using the frequency based communication mode and the time based communication mode based on a scheduling function, in which the scheduling function includes one or more of the following: proportional fairness, round robin, maximum throughput, time multiplex function, a spatial multiplex function, a time reuse function, and a frequency reuse function.

In some embodiments, the multi-mode communication unit allocates access for communication using the frequency based communication mode and the time based communication mode using at least two frequency bands, in which the at least two frequency bands are overlapping, and in which a first frequency band can be a subset and/or a superset of a second frequency band.

In some embodiments, the system is a multi-mode device, in which the multi-mode device is selected from one or more of the following: a terminal, a base station, and a repeater. In some embodiments, the system is a multi-mode device, in which the multi-mode device is a terminal, and in which the terminal is selected from one or more of the following: a mobile phone, UE, Datacard, broadcast receiver, and broadcast transmitter. In some embodiments, the system is a multi-mode device, in which the multi-mode device communicates with other multi-mode devices in a peer-to-peer wireless communication network, wireless backhaul, or relay using time division duplexing (TDD) frames. In some embodiments, the system is a multi-mode device, in which the multi-mode device is a base station, in which the base station is selected from one or more of the following: a cellular base station, a microcell base station, a Microcell base station, a Pico cell base station, a Femto cell base station, an Access Point (AP), a Set Top Box (STB), a Home Gateway, a Hot Spot Device, a User Terminal, a repeater, a relay, and a WiFi. In some embodiments, the system includes a repeater, in which the repeater operates as a terminal and as a base station.

In some embodiments, the multi-mode communication unit communicates using a protocol, and in which the protocol includes one or more of the following: LTE, WiMax, HSPA, CDMA2000/1xEVDO, TD-SCDMA, and WiFi.

In some embodiments, a time based communication mode facilitates network communication using a time based criteria and/or methodology (e.g., TDD and other similar communication modes). In some embodiments, a frequency based communication mode facilitates network communication based on a frequency based criteria and/or methodology (e.g., FDD and other similar communication modes).

In various wireless environments (e.g., orthogonal frequency division multiplexing (OFDM) systems or other wireless standards, such as the 3GPP LTE standard (e.g., 3GPP Release 8, 9, and beyond), in which both TDD and FDD modes are supported), TDD and FDD modes can be deployed and operated simultaneously using various techniques described herein.

LTE is an OFDM based system with both TDD and FDD modes (e.g., communication modes). The LTE FDD and TDD frame structure defined by the LTE standard is shown in FIG. 1 and FIG. 16. FIG. 1 provides an illustration of an LTE FDD and TDD frame structure as an example of an air interface with FDD and TDD modes. FIG. 16 provides a table of uplink-downlink configurations for LTE TDD frame structure defined in the 3GPP standard.

In some embodiments, dual mode radio for frequency division duplexing and time division duplexing communication modes includes operating TDD (both Downlink and Uplink) in the FDD Downlink (DL) carrier frequency, by, for example, using one carrier frequency for FDD DL and TDD, and another carrier frequency for FDD Uplink (UL). In some embodiments, dual mode radio for frequency division duplexing and time division duplexing communication modes includes, within the FDD DL/TDD carrier frequency, using the TDM frame structure to separate FDD DL and TDD DL/UL, in which FDD DL, TDD DL, and TDD UL frames do not operate at the same time, but rather, operate in a TDM manner.

Figure 2:
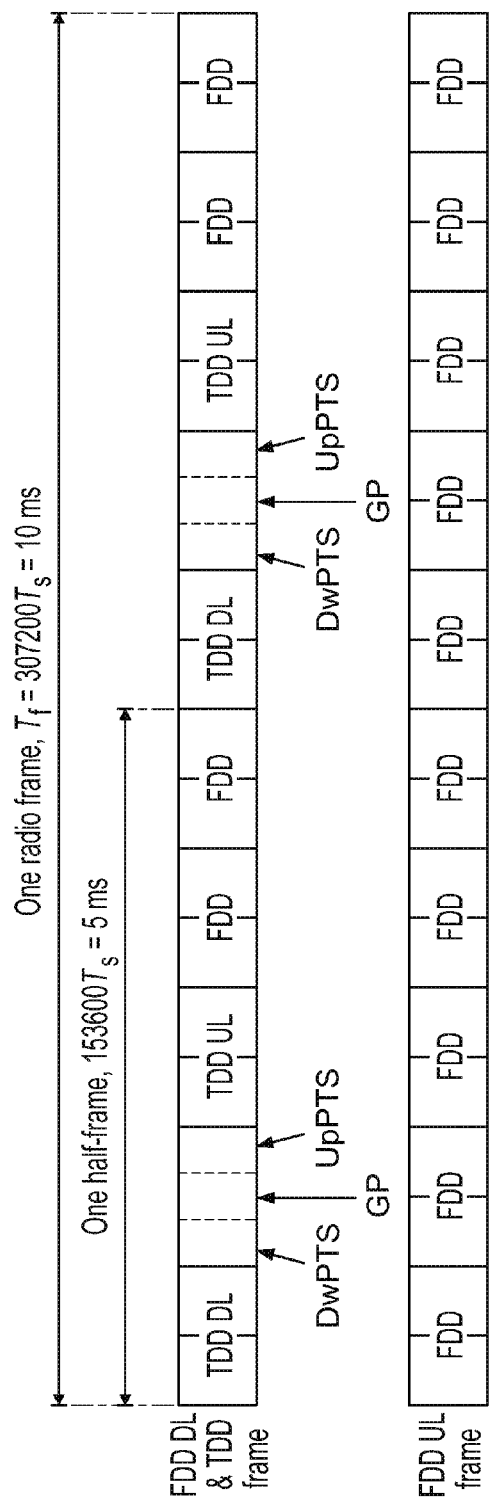
FIG. 2 provides an illustration of operating TDD with FDD-DL in the same carrier frequency in accordance with some embodiments.

For example, the techniques described above can be applied to LTE as shown in FIG. 2 and FIG. 17. FIG. 2 provides an illustration of operating TDD with FDD-DL in the same carrier frequency in accordance with some embodiments. As shown in FIG. 2, FDD-DL subframes are interleaved with TDD subframes in the same carrier frequency. FIG. 17 provides a table of examples of transmitting a FDD-DL subframe in a TDD configuration in accordance with some embodiments. As described herein, various techniques can be used to allocate access for providing TDD with FDD-DL in the same carrier frequency operating in a TDM manner (e.g., using various algorithms or functions, such as proportional fairness, round robin, maximum throughput, time multiplex function, a spatial multiplex function, a time reuse function, a frequency reuse function, and/or other techniques as will now be apparent to one of ordinary skill in the art).

Figure 3:
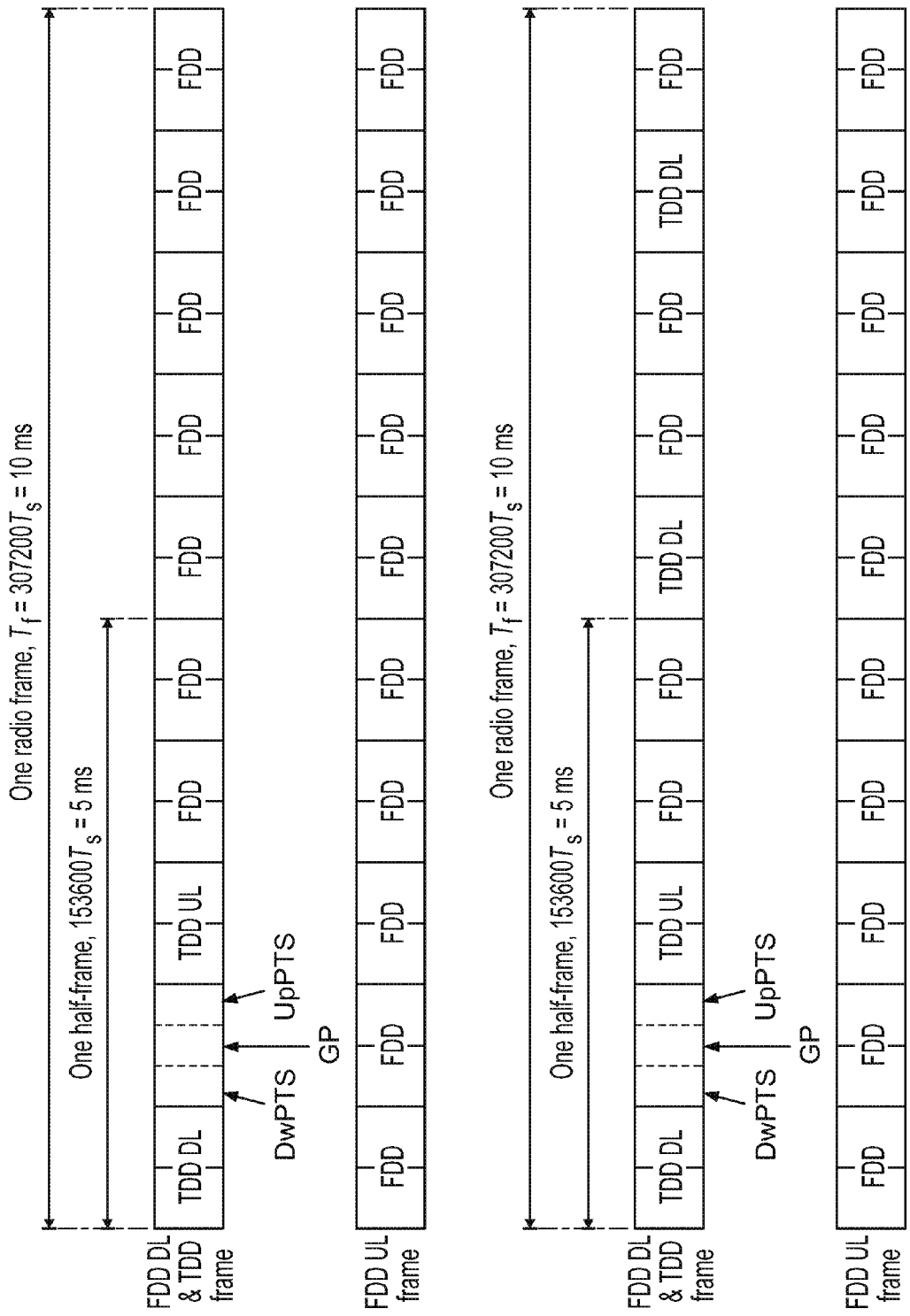
FIG. 3 provides more examples of operating TDD with FDD-DL in the same carrier frequency in accordance with some embodiments.

FIG. 3 provides more examples of operating TDD with FDD-DL in the same carrier frequency in accordance with some embodiments. Other possible configurations can be derived based on the techniques described herein as will now be apparent to one of ordinary skill in the art.

In some embodiments, dual mode radio for frequency division duplexing and time division duplexing communication modes includes operating TDD (DL/UL) in FDD UL carrier frequency using one carrier frequency for FDD UL and TDD, and another frequency for FDD DL. In some embodiments, dual mode radio for frequency division duplexing and time division duplexing communication modes includes, within the FDD UL/TDD carrier frequency, using the TDM frame structure to separate FDD UL and TDD DL/UL, in which FDD UL, TDD DL, and TDD UL frames do not operate at the same time, but rather, operate in a TDM manner.

Figure 4:
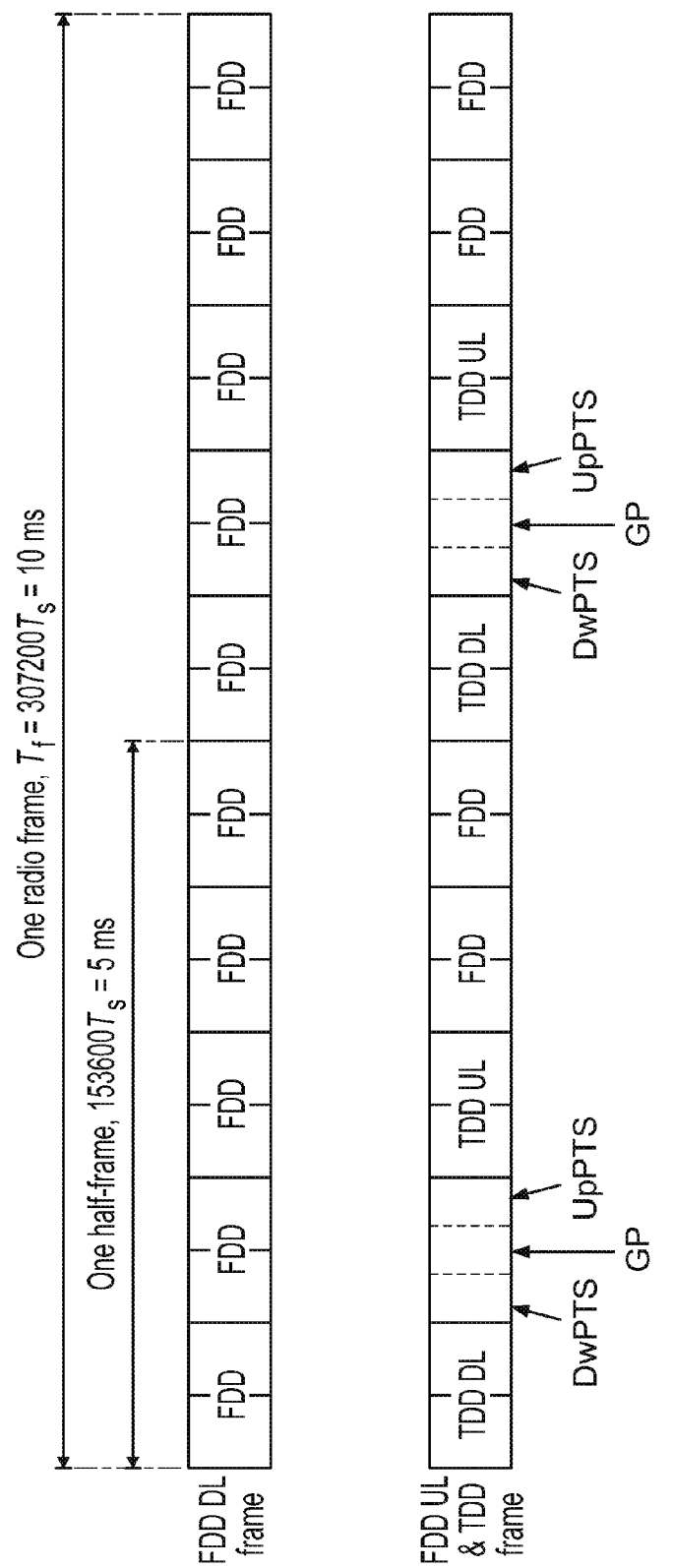
FIG. 4 provides an illustration of operating TDD with FDD-UL in the same carrier frequency in accordance with some embodiments.

For example, the techniques described above can be applied to LTE as shown in FIG. 4 and FIG. 18. FIG. 4 provides an illustration of operating TDD with FDD-UL in the same carrier frequency in accordance with some embodiments. As shown in FIG. 4, FDD-UL subframes are interleaved with TDD subframes in the same carrier frequency. FIG. 18 provides a table of examples of transmitting a FDD-UL subframe in a TDD configuration in accordance with some embodiments. As described herein, various techniques can be used to allocate access for providing TDD with FDD-UL in the same carrier frequency operating in a TDM manner (e.g., using various algorithms or functions, such as proportional fairness, round robin, maximum throughput, time multiplex function, a spatial multiplex function, a time reuse function, a frequency reuse function, and/or other techniques as will now be apparent to one of ordinary skill in the art).

Figure 5:
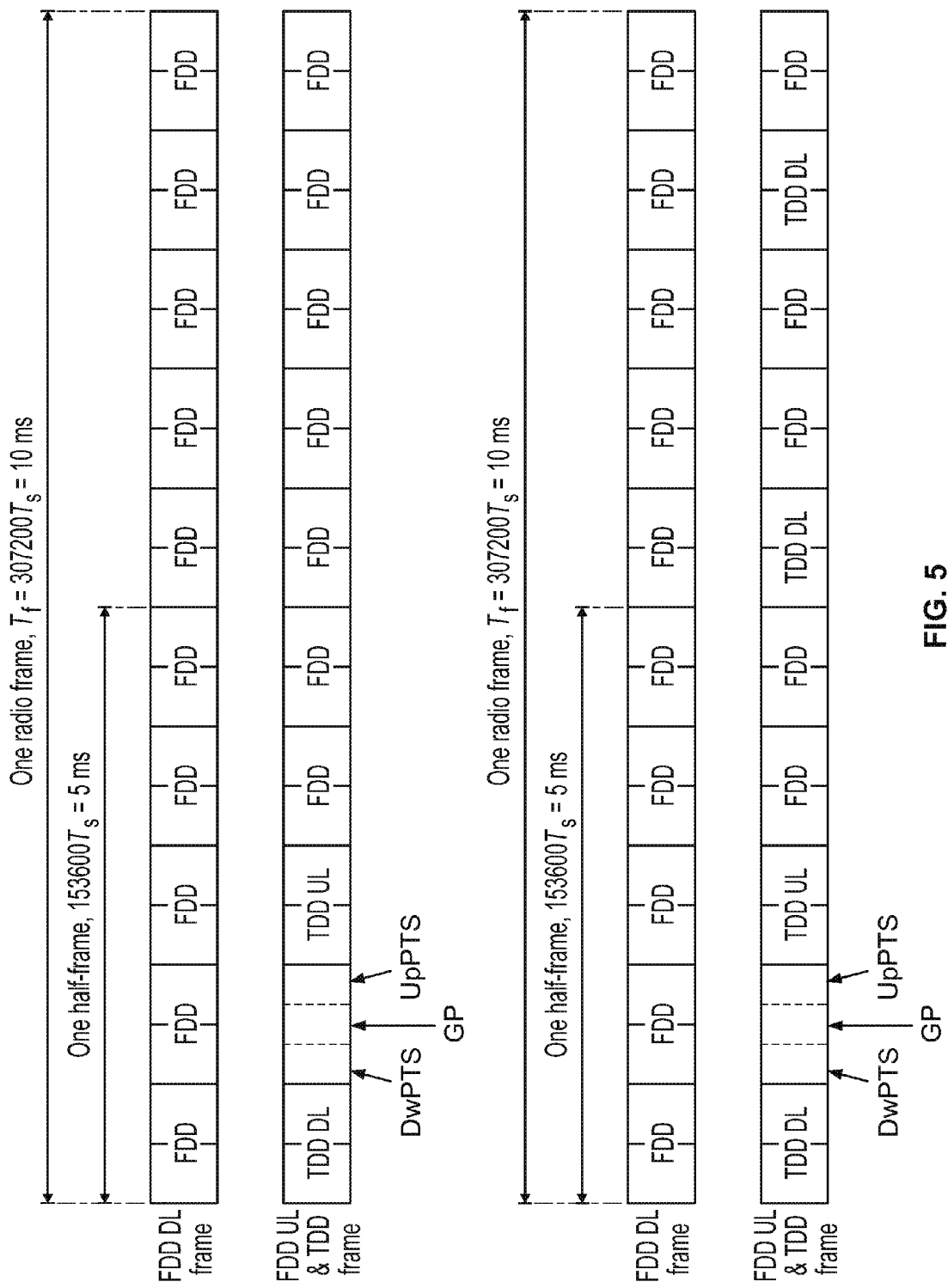
FIG. 5 provides more examples of operating TDD with FDD-UL in the same carrier frequency in accordance with some embodiments.

FIG. 5 provides more examples of operating TDD with FDD-UL in the same carrier frequency in accordance with some embodiments. Other possible configurations can be derived based on the techniques described herein as will now be apparent to one of ordinary skill in the art.

In some embodiments, dual mode radio for frequency division duplexing and time division duplexing communication modes includes operating TDD (DL/UL) in FDD UL carrier frequency using one carrier frequency for FDD UL and TDD, and another frequency for FDD DL. In some embodiments, dual mode radio for frequency division duplexing and time division duplexing communication modes includes, within the FDD UL/TDD carrier frequency, FDD UL and TDD UL can transmit at the same time (e.g., using the same frame) by using a different portion of frequency band, by, for example, using different sub-carrier groups. In some embodiments, FDD UL and TDD UL subframes are separated from TDD DL subframes using a TDM frame structure (e.g., as similarly described above).

Figure 7:
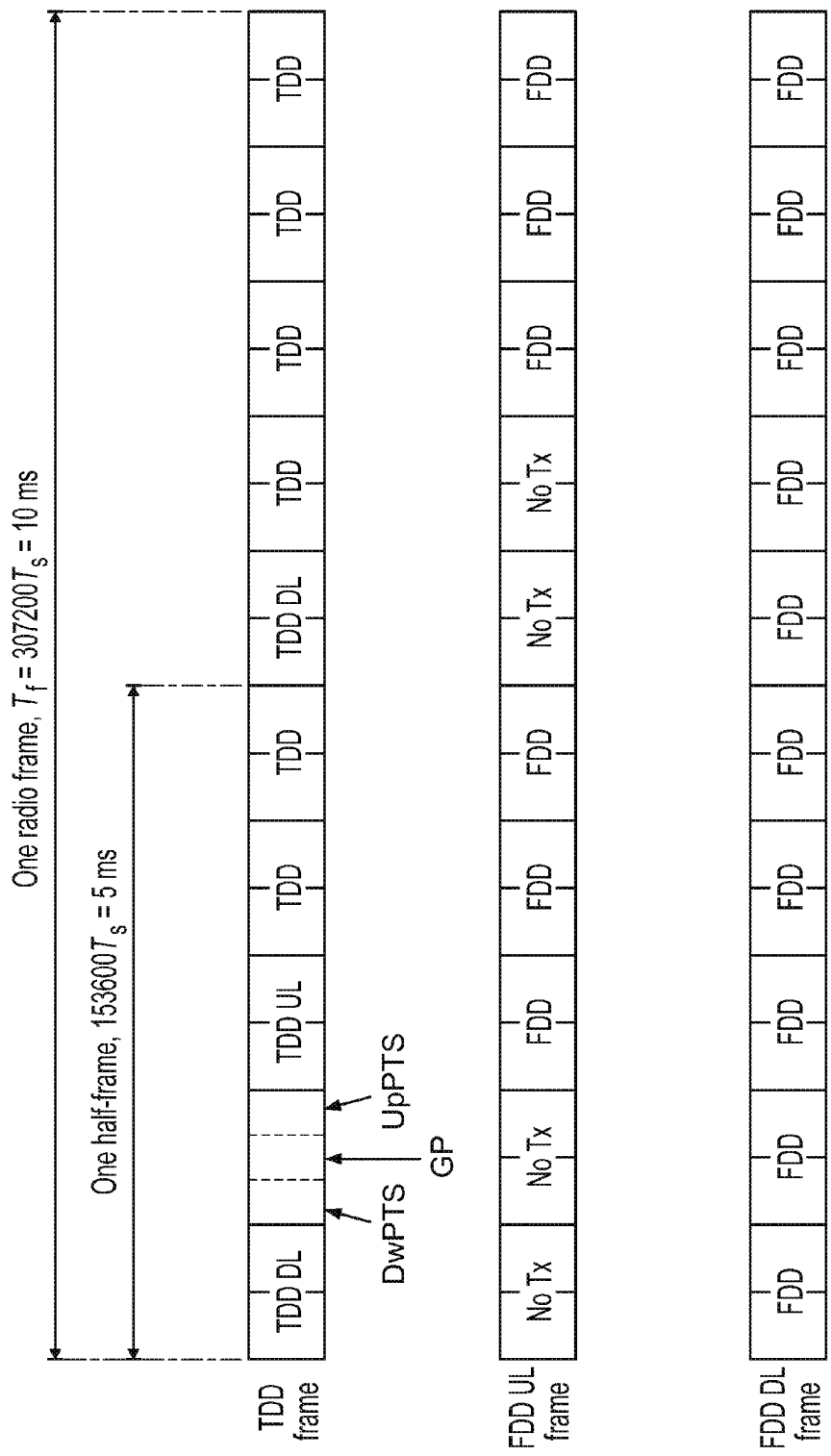
FIG. 7 provides an illustration of operating TDD and FDD-UL in the same carrier frequency but using a different portion of the sub-frequency groups in accordance with some embodiments.

For example, the techniques described above can be applied to LTE as shown in FIG. 7. FIG. 7 provides an illustration of operating TDD and FDD-UL in the same carrier frequency but using a different portion of the sub-frequency groups in accordance with some embodiments.

In some embodiments, dual mode radio for frequency division duplexing and time division duplexing communication modes includes operating TDD (DL/UL) in FDD DL carrier frequency using one carrier frequency for FDD DL and TDD, and another frequency for FDD UL. For example, within the FDD DL/TDD frequency, FDD DL and TDD DL can transmit at the same time (e.g., using the same frame) by using a different portion of a frequency band, by, for example, using different sub-carrier groups. In some embodiments, FDD DL and TDD DL subframes are separated from TDD UL subframes using a TDM frame structure (e.g., as similarly described above).

Figure 6:
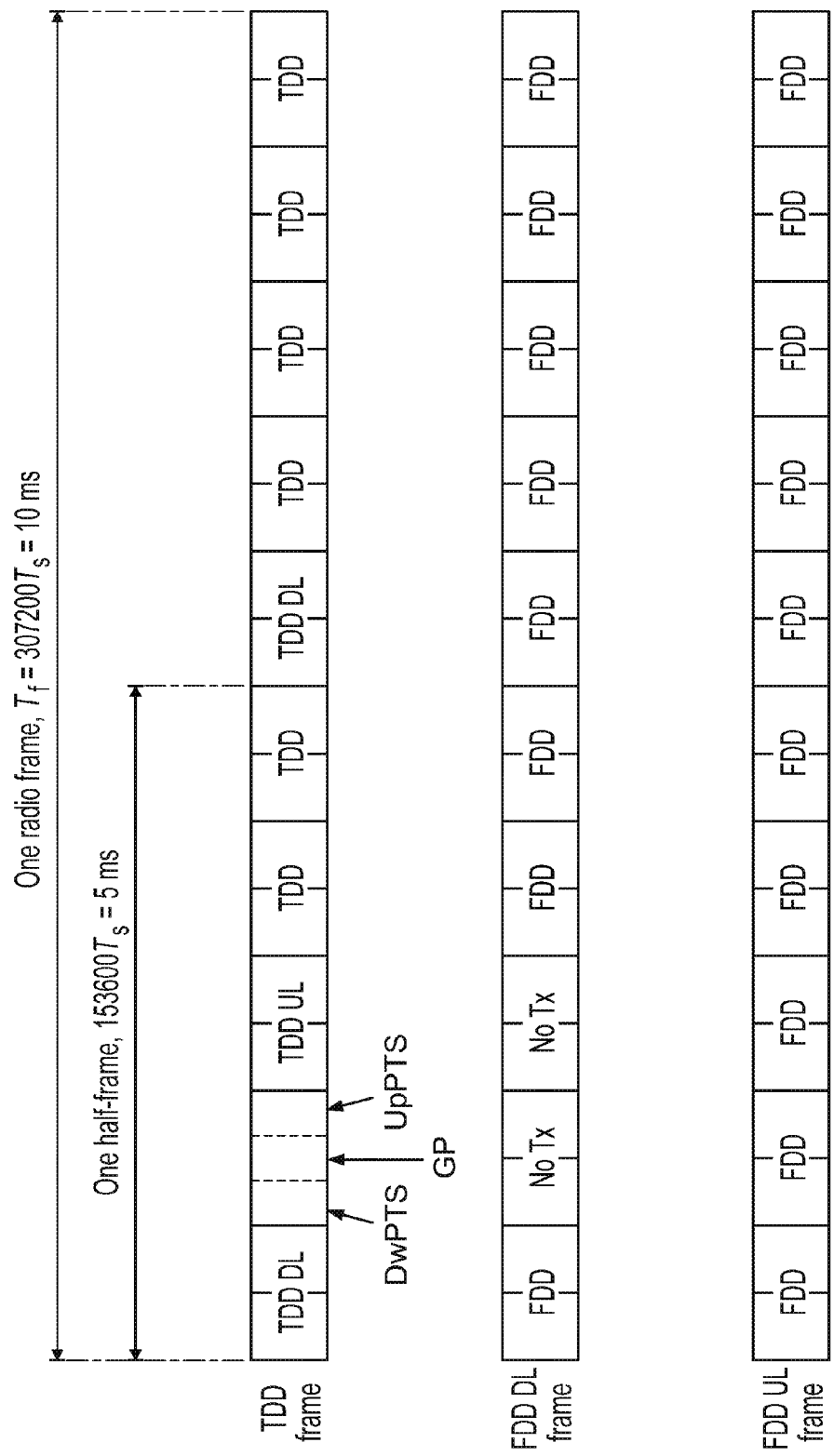
FIG. 6 provides an illustration of operating TDD and FDD-DL in the same carrier frequency but using a different portion of the sub-frequency groups in accordance with some embodiments.

FIG. 6 provides an illustration of operating TDD and FDD-DL in the same carrier frequency but using a different portion of the sub-frequency groups in accordance with some embodiments. Other possible configurations can be derived based on the techniques described herein as will now be apparent to one of ordinary skill in the art.

Figure 8:
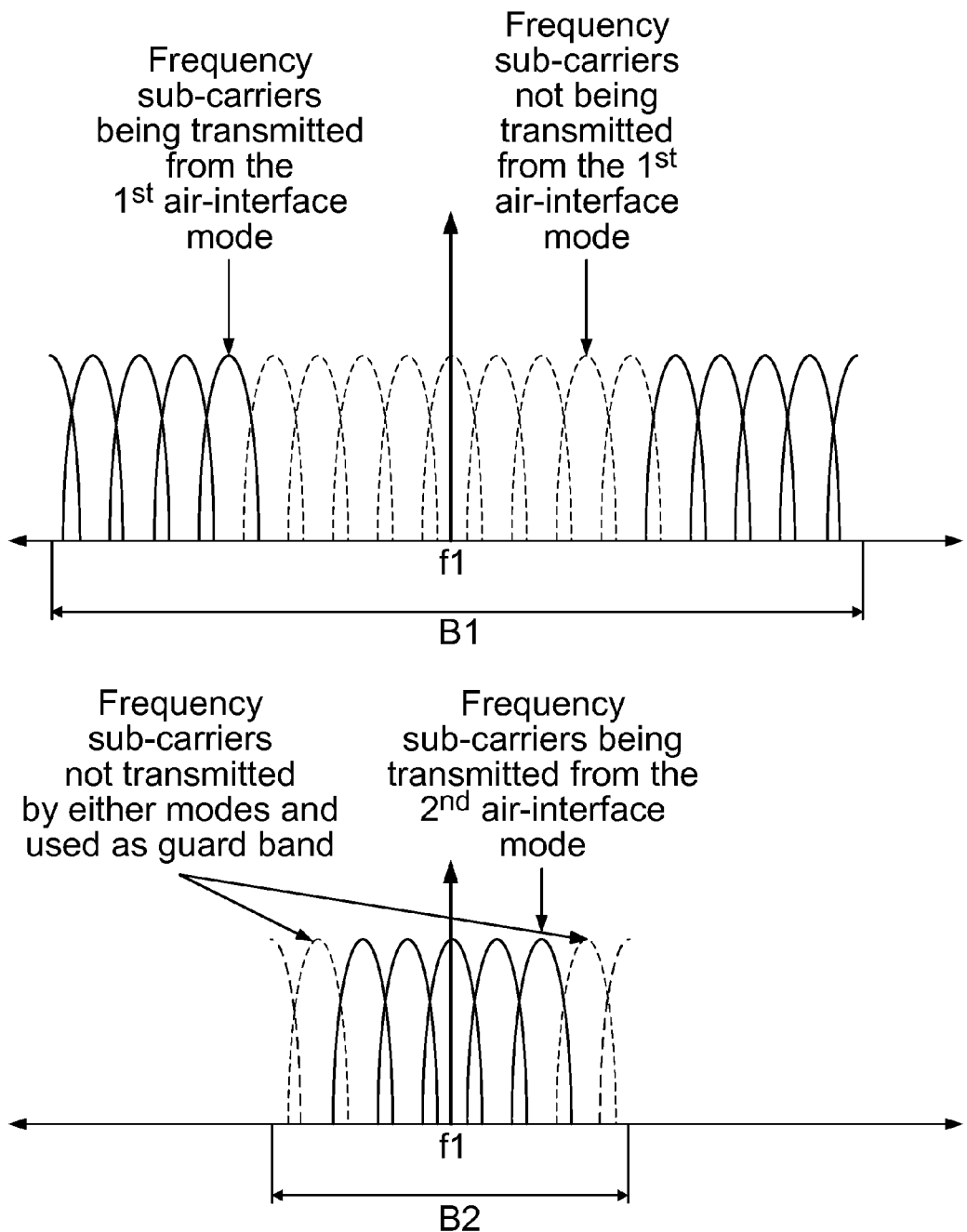
FIG. 8 provides an illustration of an example of operating TDD and FDD-DL (or FDD-UL) in the same carrier frequency but using a different portion of the sub-frequency groups in accordance with some embodiments.

FIG. 8 provides an illustration of an example of operating TDD and FDD-DL (or FDD-UL) in the same carrier frequency but using a different portion of the sub-frequency groups in accordance with some embodiments. In some embodiments, dual mode radio for frequency division duplexing and time division duplexing communication modes includes providing TDD and FDD DL using different sub-carriers in an OFDM system. For example, frequency sub-carriers not transmitted by either mode can be used as a guard band, as shown in FIG. 8. Various techniques can be used to use a single air interface to transmit TDD and FDD UL using different sub-carriers in an OFDM system as will now be apparent to one of ordinary skill in the art.

Figure 9:
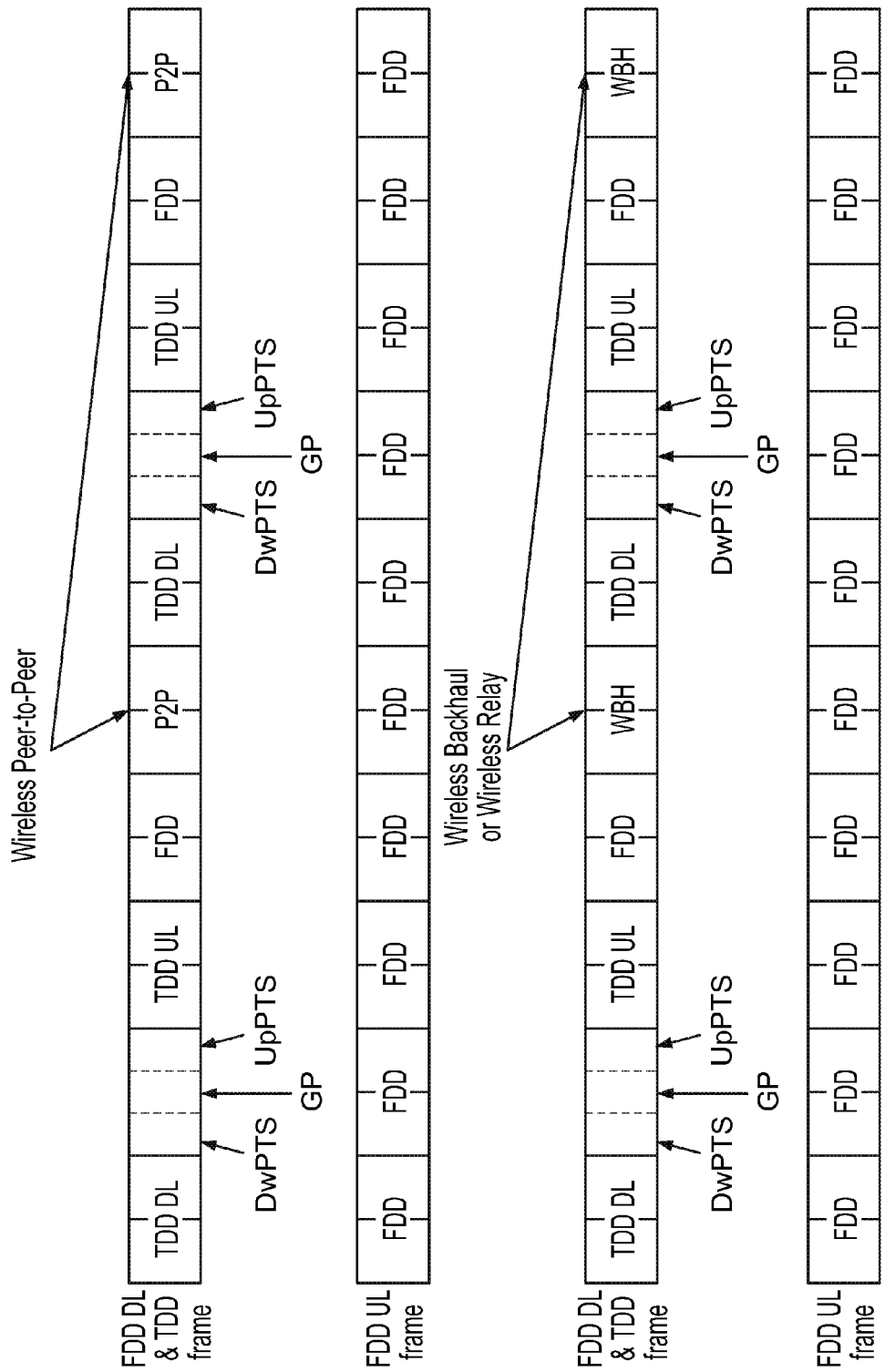
FIG. 9 provides an illustration of an example of deployment of TDD systems to support devices with a different air interface to operate in certain TDD frames, such as Peer-to-Peer, and Wireless Backhaul or Wireless Relay, in accordance with some embodiments.

FIG. 9 provides an illustration of an example of deployment of TDD systems to support devices with different air interfaces to operate in certain TDD frames, such as Peer-to-Peer, and Wireless Backhaul or Wireless Relay, in accordance with some embodiments. In some embodiments, TDD subframes used for to support devices with different air interfaces to operate in certain TDD frames, such as Peer-to-Peer, and Wireless Backhaul or Wireless Relay, are separated from standard and FDD UL (/DL) and TDD UL/DL subframes using a TDM frame structure (e.g., as similarly described above).

Figure 10:
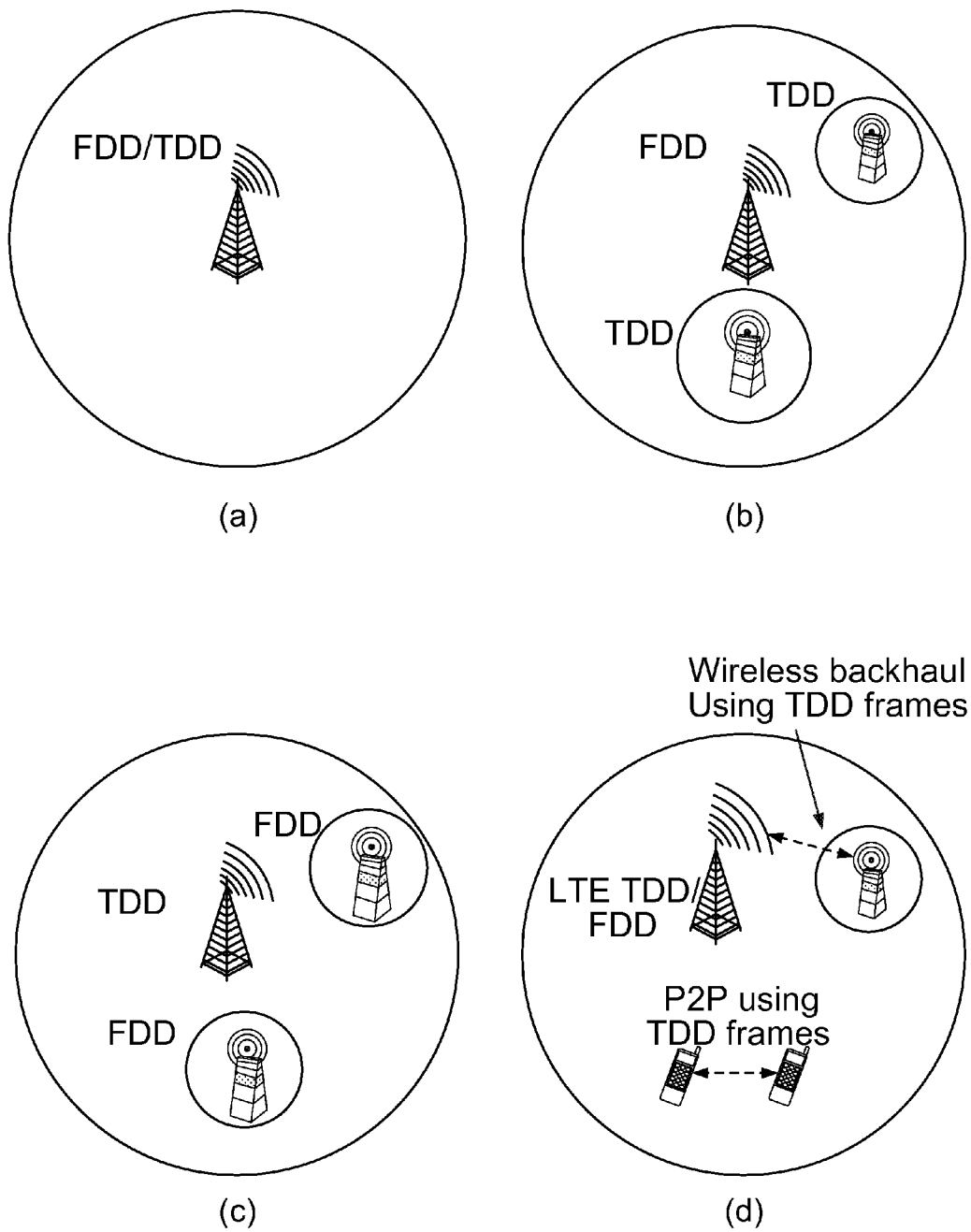
FIGS. 10(a) through 10(d) provide an illustration of examples of the TDD/FDD deployment scenarios in accordance with some embodiments.

FIGS. 10(a) through 10(d) provide an illustration of examples of the TDD/FDD deployment scenarios in accordance with some embodiments. The techniques described herein can be applied to deploy and operate TDD/FDD dual mode in an air interface, as illustrated in FIGS. 10(a) through 10(c). The techniques described herein can also be applied to deploy and operate other modes within defined TDD frame structure, such as to support devices with a different air interface to operate in certain TDD frames. One example is to support Peer-to-Peer or wireless backhaul or relay in TDD frames, as illustrated in FIG. 10(d). The techniques described herein can be applied to deploy and operate TDD/FDD dual mode in an air interface as discussed above, and the techniques described herein can also be applied to deploy and operate other modes in some of the FDD sub-frequency groups. One example is to support devices with a different air interface to operate in certain FDD sub-frequency groups as illustrated in FIG. 9 (discussed above).

In some embodiments, an FDD/TDD dual mode radio is provided. In some embodiments, the FDD/TDD dual mode radio is provided for frequency division duplexing and time division duplexing communication modes. In some embodiments, the FDD/TDD dual mode radio implements the various techniques described herein.

Figure 11:
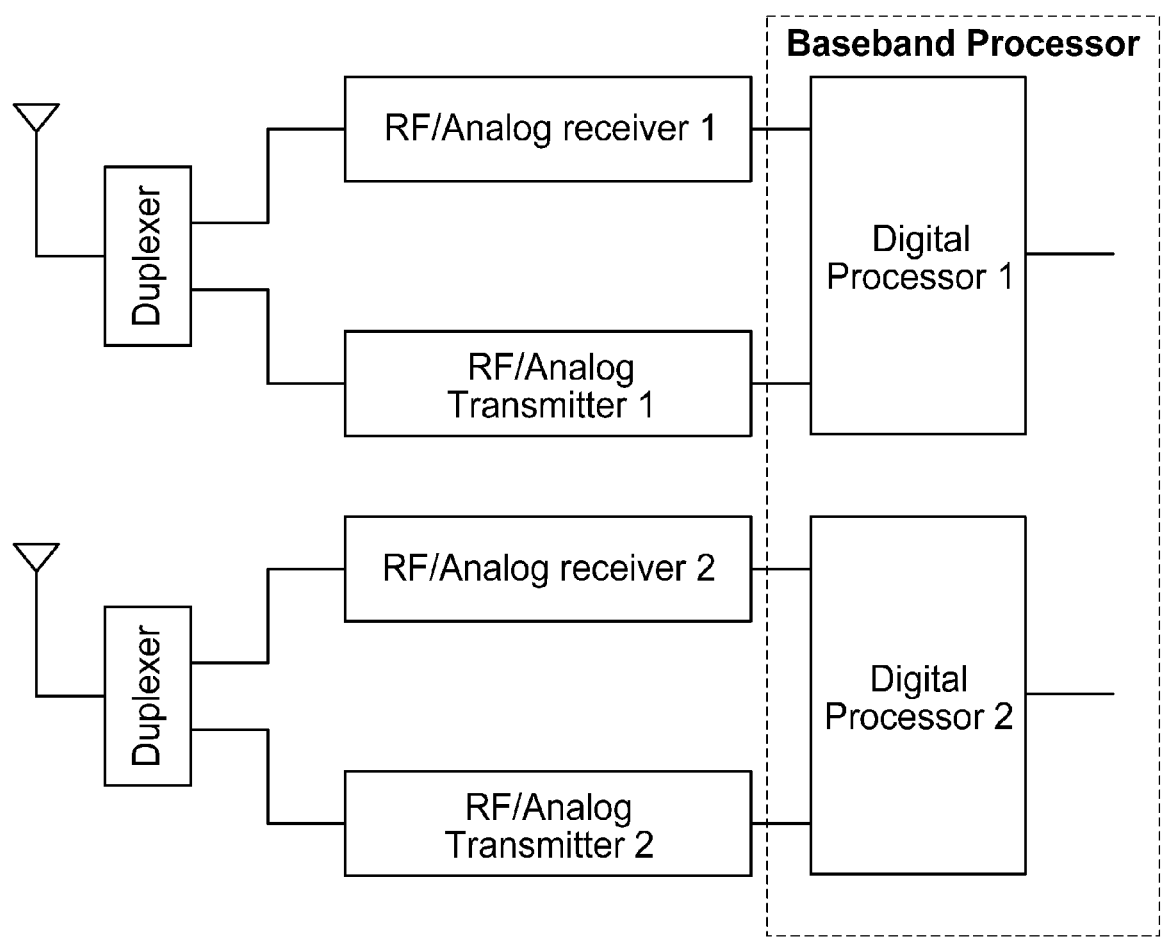
FIG. 11 provides an illustration of a prior art TDD/FDD dual mode transceiver implementation.

A traditional implementation of the FDD/TDD dual mode is to have separate RF and analog transceiver chains for the respective TDD and FDD functions primarily due to the fact that the TDD and FDD functions typically use different carrier frequencies. FIG. 11 provides an illustration of a prior art TDD/FDD dual mode transceiver implementation.

Figure 12:
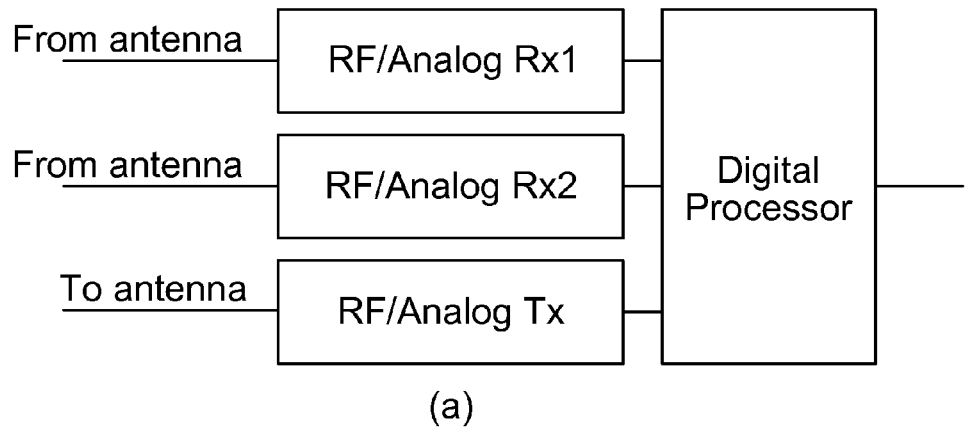
FIGS. 12(a) through 12(c) provide an illustration of a TDD/FDD implementation using two receivers and one transmitter in accordance with some embodiments.
Figure 12:
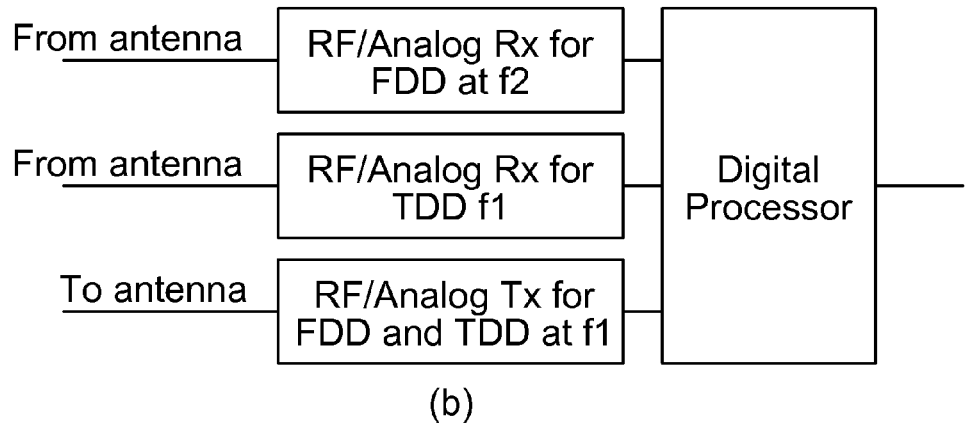
Figure 12:
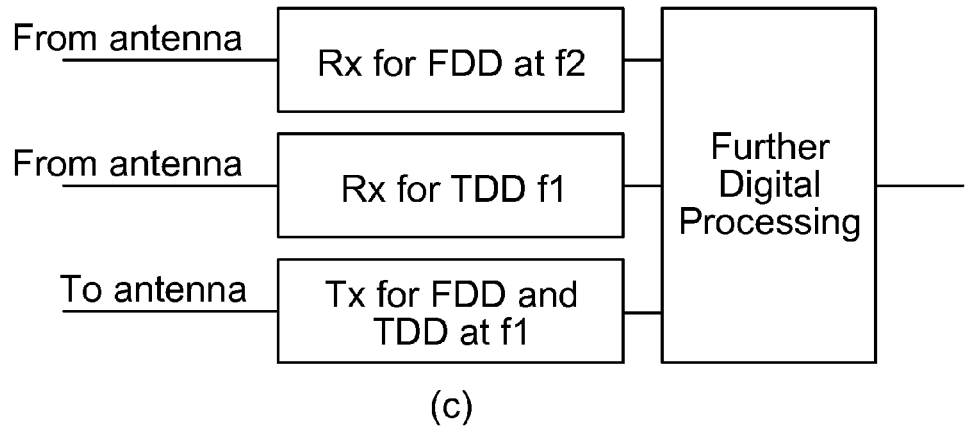

In some embodiments, in which TDD operates in the same carrier frequency as FDD DL, as described above, one transmitter (Tx) and two receiver (Rx) chains can be used instead of two transmitters and two receivers for both. For example, within each Tx or Rx chain, the partition between RF, analog and digital baseband can vary depending on the specific architecture requirements. FIGS. 12(a) through 12(c) provide an illustration of a TDD/FDD implementation using two receivers and one transmitter in accordance with some embodiments.

Figure 13:
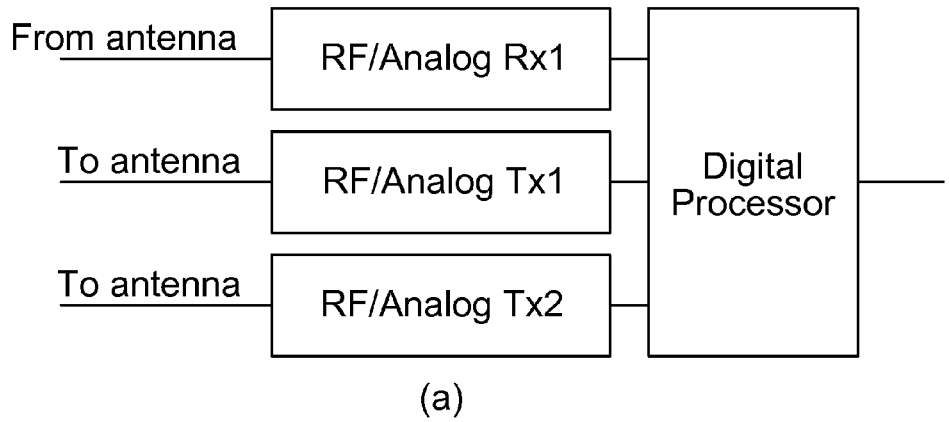
FIGS. 13(a) through 13(c) provide an illustration of a TDD/FDD implementation using one receiver and two transmitters in accordance with some embodiments.
Figure 13:
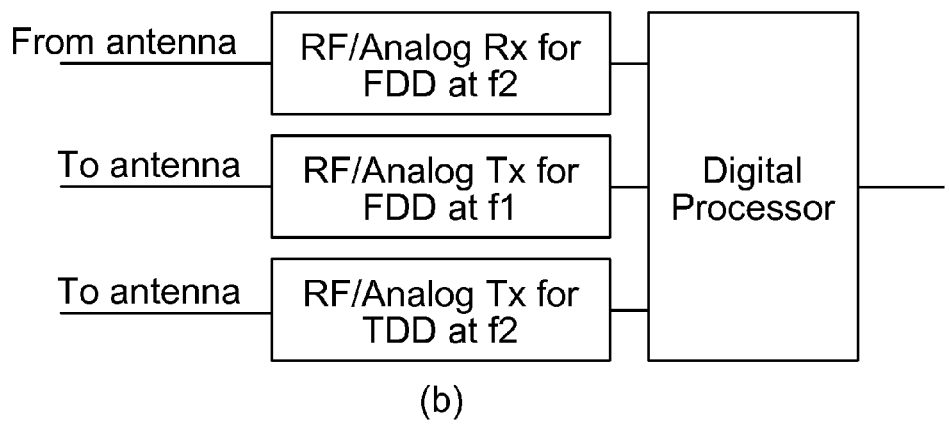
Figure 13:
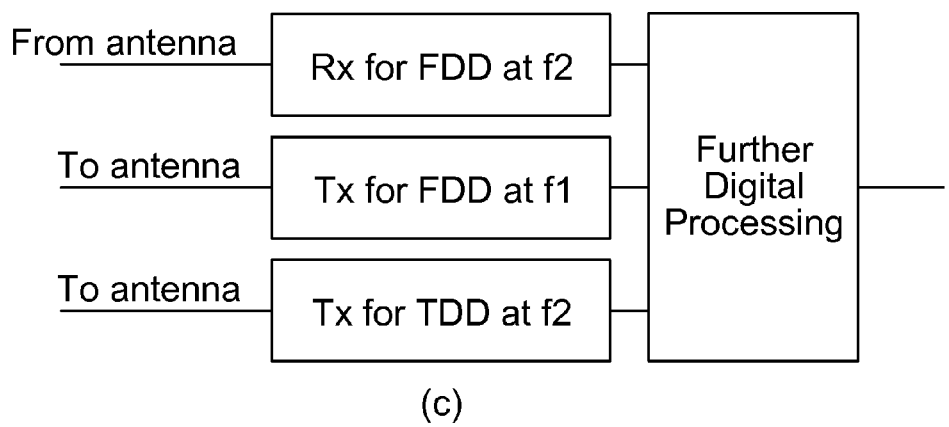

In some embodiments, in which TDD operates in the same carrier frequency as FDD UL, as described above, two transmitter and one receiver chains can be used instead of using two transmitters and two receivers for both. For example, within each Tx or Rx chain, the partition between RF, analog and digital baseband can vary depending on the specific architecture requirements. FIGS. 13(a) through 13(c) provide an illustration of a TDD/FDD implementation using one receiver and two transmitters in accordance with some embodiments.

Figure 14:
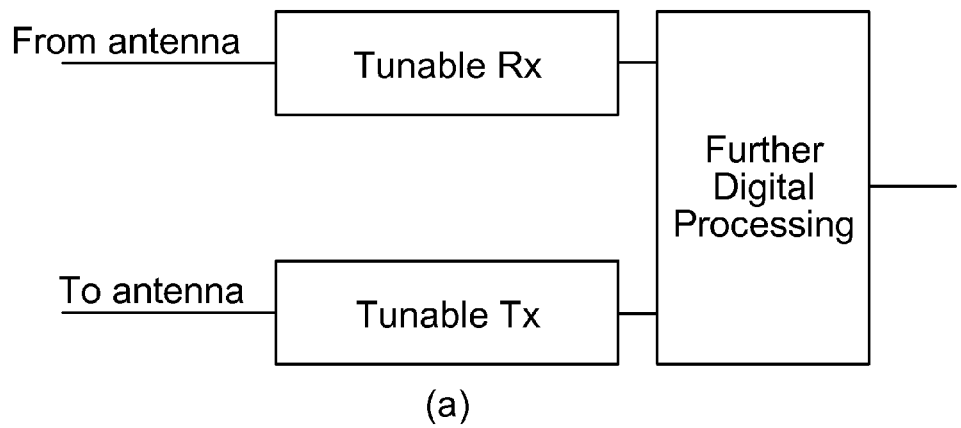
FIGS. 14(a) through 14(b) provide an illustration of a TDD/FDD implementation using one tunable receiver and one tunable transmitter in accordance with some embodiments.
Figure 14:
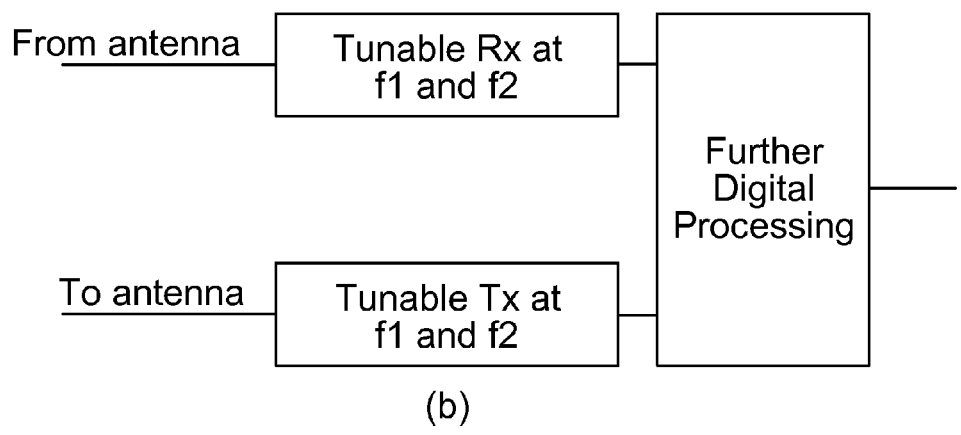

For example, the FDD/TDD dual mode radio can also be implemented by transceivers that are tunable for multiple carrier frequencies. For example, by using tunable transceivers, one Tx and one RX chain can be used. In some embodiments, a tunable transceiver can be implemented in different forms. In some embodiments, a tunable transceiver implements all or most traditional RF/Analog functions in the digital domain such that different carrier frequencies can be supported using one transceiver. In some embodiments, a tunable transceiver implements a sample wideband RF signal to digital signal such that it can be processed in the digital domain to handle different carrier frequencies. FIGS. 14(a) through 14(b) provide an illustration of a TDD/FDD implementation using one tunable receiver and one tunable transmitter in accordance with some embodiments.

Figure 15:
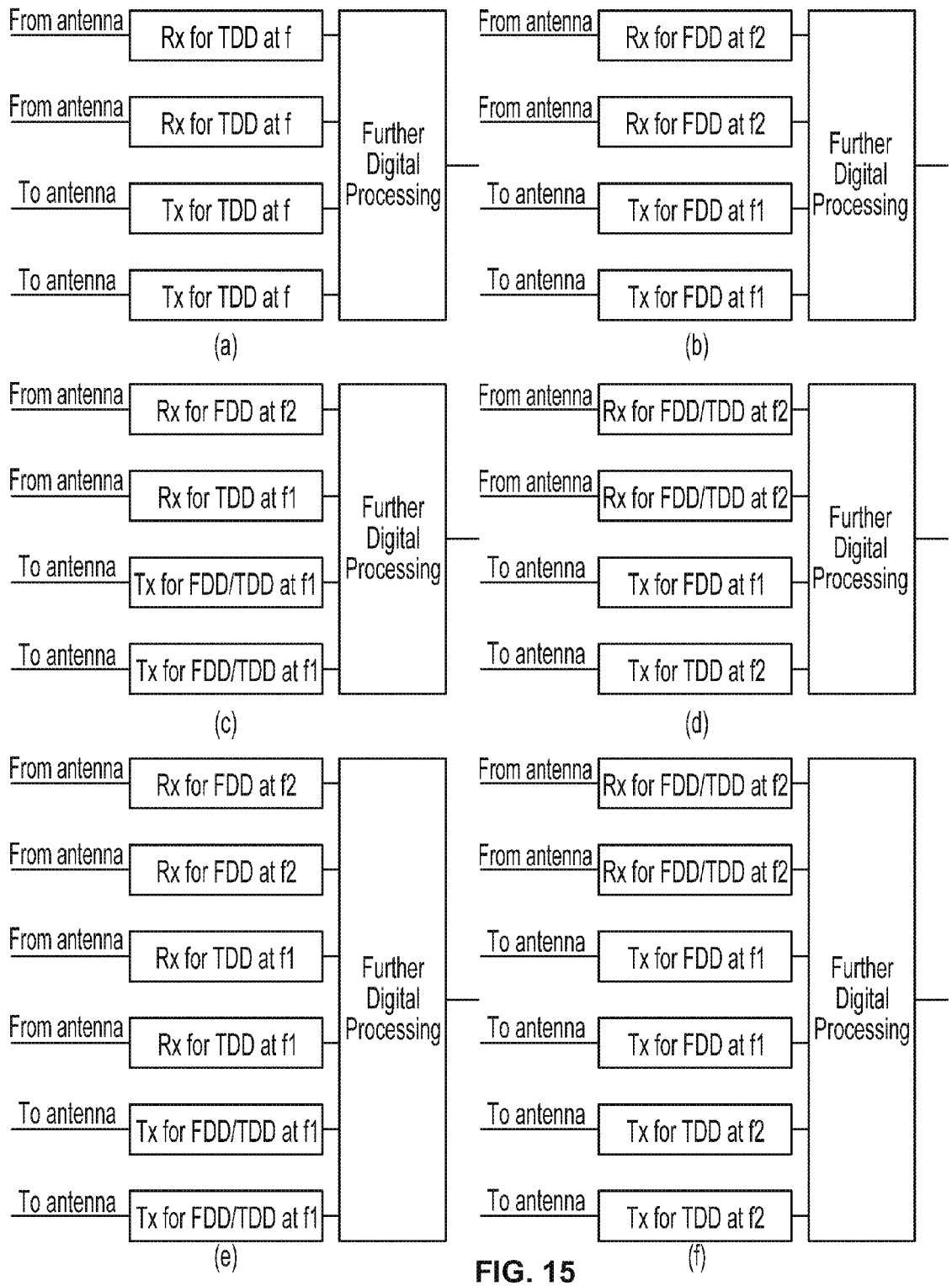
FIGS. 15(a) through 15(f) provide an illustration of a prior art TDD/FDD MIMO implementation: (a) 2Tx and 2Rx for TDD and (b) 2Tx and 2Rx for FDD; and various TDD/FDD MIMO implementations in accordance with some embodiments: (c) 2Tx and 1Rx for TDD/FDD DL share the same carrier frequency, (d) 2Rx and 1Tx TDD/FDD UL share the same carrier frequency, (e) 2Tx and 2Rx for TDD/FDD DL share the same carrier frequency, and (f) 2Rx and 2Tx TDD/FDD UL share the same carrier frequency.

FIGS. 15(a) through 15(f) provide an illustration of a prior art TDD/FDD MIMO implementation: (a) two Tx and two Rx for TDD and (b) two Tx and two Rx for FDD; and various TDD/FDD MIMO implementations in accordance with some embodiments: (c) two Tx and one Rx for TDD/FDD DL sharing the same carrier frequency, (d) two Rx and one Tx TDD/FDD UL sharing the same carrier frequency, (e) two Tx and two Rx for TDD/FDD DL sharing the same carrier frequency, and (f) two Rx and two Tx for TDD/FDD UL sharing the same carrier frequency. In the Multiple-Input-Multiple-Out (MIMO) systems, a prior art TDD/FDD MIMO implementation usually requires one transceiver chain per antenna per mode. For example, to implement two transmit and two receive antennas for TDD mode requires four chains as shown in FIG. 15(a). Similarly, to implement two transmit and two receive antennas for FDD mode requires chains as shown in FIG. 15(b).

According to the above described embodiments, using four chains can implement two Tx and one Rx antennas for the case of TDD/FDD DL sharing the same carrier frequency, as shown in FIG. 15(c). Using 6 chains can implement two Tx and two Rx antennas for the case of TDD/FDD DL sharing the same carrier frequency, as shown in FIG. 15(e). In both cases, these implementations are more efficient and provide for a cost savings for the implementation.

According to the above described embodiments, using four chains can also implement one Tx and two Rx antennas for the case of TDD/FDD UL sharing the same carrier frequency, as shown in FIG. 15(d). Using 6 chains can implement two Tx and two Rx antennas for the case of TDD/FDD UL sharing the same carrier frequency, as shown in FIG. 15(f). In both cases, these implementations are more efficient and provide for a cost savings for the implementation.

The various techniques and embodiments described herein can be applied to a base station (BTS), an access point (AP), a relay station (RS) or remote station, and/or a user terminal.

Those of ordinary skill in the art will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular system and design constraints imposed on the overall system. Those of ordinary skill in the art can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), a text messaging system specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as text messaging specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a multi-mode communication unit for wireless communication, wherein the multi-mode communication unit allocates access for a time based communication mode and a frequency based communication mode;
 a first RF/analog front end, wherein the multi-mode communication unit using the time based communication mode is provided at least in part using the first RF/analog front end;
 a second RF/analog front end, wherein the multi-mode communication unit using the frequency based communication mode is provided at least in part using the second RF/analog front end; and
 a processor configured to implement at least in part the multi-mode communication unit,
 wherein the multi-mode communication unit allocates access for communication by operating a TDD Downlink (TDD DL) communication mode and a TDD Uplink (TDD UL) communication mode using a first carrier frequency, and one of a FDD Uplink (FDD UL) and a FDD Downlink (FDD DL) using a second carrier frequency;
 wherein a guard band subframe, using the first carrier frequency, is between a TDD DL subframe and a TDD UL subframe; and
 wherein the multi-mode communication unit allocates access for communication by operating the TDD Downlink (TDD DL) communication mode and the TDD Uplink (TDD UL) communication mode in an FDD Downlink (FDD DL) carrier frequency, using the first carrier frequency for FDD DL and TDD DL/UL, and using the second carrier frequency for FDD Uplink (FDD UL), and wherein within the first carrier frequency, using a TDM frame structure to separate FDD DL communications from TDD DL and TDD UL communications.

2. The system recited in claim 1, wherein the time based communication mode includes a time division duplexing (TDD) communication mode, and the frequency based communication mode includes a frequency division duplexing (FDD) communication mode.

3. The system recited in claim 1, wherein the time based communication mode includes a time division duplexing (TDD) communication mode for a 3GPP Long Term Evolution (LTE) standard, and the frequency based communication mode includes a frequency division duplexing (FDD) communication mode for a 3GPP Long Term Evolution (LTE) standard.

4. The system recited in claim 1, wherein the processor implements the multi-mode communication unit.

5. The system recited in claim 1, wherein the processor is a digital processor, and wherein the digital processor implements the multi-mode communication unit.

6. The system recited in claim 1, wherein the multi-mode communication unit includes a plurality of executable instructions for allocating access for communication using the time based communication mode and the frequency based communication mode, and wherein the processor is configured to execute the multi-mode communication unit.

7. The system recited in claim 1, wherein the multi-mode communication unit further comprises:
a dual mode radio in communication with the multi-mode communication unit, wherein the dual mode radio communicates using the time based communication mode and the frequency based communication mode.

8. The system recited in claim 1, further comprising:
an RF/analog front end in communication with the multi-mode communication unit, wherein the multi-mode communication is provided at least in part using the RF/analog front end.

9. The system recited in claim 1, further comprising:
a first RF/analog front end receiver, wherein the multi-mode communication for the time based communication mode is received using at least in part the first RF/analog front end;
a second RF/analog front end receiver, wherein the multi-mode communication for the frequency based communication mode is received using at least in part the second RF/analog front end; and
a shared RF/analog front end transmitter, wherein the multi-mode communication for the frequency based communication mode and the time based communication mode is transmitted using at least in part the shared RF/analog front end transmitter.

10. The system recited in claim 1, further comprising:
a shared RF/analog front end receiver, wherein the multi-mode communication for the frequency based communication mode and the time based communication mode is received using at least in part the shared RF/analog front end receiver;
a first RF/analog front end transmitter, wherein the multi-mode communication for the time based communication mode is transmitted using at least in part the first RF/analog front end transmitter; and
a second RF/analog front end transmitter, wherein the multi-mode communication for the frequency based communication mode is transmitted using at least in part the second RF/analog front end transmitter.

11. The system recited in claim 1, further comprising:
a first RF/analog front end receiver, wherein the multi-mode communication for the time based communication mode is received using at least in part the first RF/analog front end receiver;
a second RF/analog front end receiver, wherein the multi-mode communication for the frequency based communication mode is received using at least in part the second RF/analog front end receiver;
a first RF/analog front end transmitter, wherein the multi-mode communication for the time based communication mode is transmitted using at least in part the first RF/analog front end transmitter; and
a second RF/analog front end transmitter, wherein the multi-mode communication for the frequency based communication mode is transmitted using at least in part the second RF/analog front end transmitter.

12. The system recited in claim 1, further comprising:
a first RF/analog front end receiver, wherein the multi-mode communication for the time based communication mode is received using at least in part the first RF/analog front end receiver;
a second RF/analog front end receiver, wherein the multi-mode communication for the frequency based communication mode is received using at least in part the second RF/analog front end receiver; and
a first RF/analog front end transmitter, wherein the multi-mode communication for the time based communication mode is transmitted using at least in part the first RF/analog front end transmitter; and
a second RF/analog front end transmitter, wherein the multi-mode communication for the frequency based communication mode is transmitted using at least in part the second RF/analog front end transmitter;
wherein the frequency based communication mode includes a frequency based uplink communication mode and a frequency based downlink communication mode, and the time based communication mode and the frequency based uplink communication mode share a common carrier frequency and are communicated using a time division multiplexing (TDM) frame structure.

13. The system recited in claim 1, further comprising:
a first RF/analog front end receiver, wherein the multi-mode communication for the time based communication mode is received using at least in part the first RF/analog front end receiver;
a second RF/analog front end receiver, wherein the multi-mode communication for the frequency based communication mode is received using at least in part the second RF/analog front end receiver; and
a first RF/analog front end transmitter, wherein the multi-mode communication for the time based communication mode is transmitted using at least in part the first RF/analog front end transmitter; and
a second RF/analog front end transmitter, wherein the multi-mode communication for the frequency based communication mode is transmitted using at least in part the second RF/analog front end transmitter;
wherein the frequency based communication mode includes a frequency based uplink communication mode and a frequency based downlink communication mode, and the time based communication mode and the frequency based downlink communication mode share a common carrier frequency and are communicated using a time division multiplexing (TDM) frame structure.

14. The system recited in claim 1, further comprising:
a tunable receiver in communication with the multi-mode communication unit, wherein the multi-mode communication for the frequency based communication mode and the time based communication mode is received using at least in part the tunable receiver; and
a tunable transmitter in communication with the multi-mode communication unit, wherein the multi-mode communication for the frequency based communication mode and the time based communication mode is transmitted using at least in part the tunable transmitter.

15. The system recited in claim 1, further comprising:
a tunable receiver in communication with the multi-mode communication unit, wherein the multi-mode communication for the frequency based communication mode and the time based communication mode is received using at least in part the tunable receiver, and wherein the tunable receiver is tunable to a first frequency and a second frequency; and
a tunable transmitter in communication with the multi-mode communication unit, wherein the multi-mode communication for the frequency based communication mode and the time based communication mode is transmitted using at least in part the tunable transmitter, and wherein the tunable transmitter is tunable to a first frequency and a second frequency.

16. The system recited in claim 1, further comprising:
an antenna in communication with the multi-mode communication unit.

17. The system recited in claim 1, further comprising:
an antenna in communication with the multi-mode communication unit, wherein the multi-mode communication is provided at least in part using the antenna, wherein the antenna is shared for providing the multi-mode communication using the frequency based communication mode and the time based communication mode.

18. The system recited in claim 1, wherein the multi-mode communication unit allocates access for communication using the frequency based communication mode and the time based communication mode based on a scheduling function.

19. The system recited in claim 1, wherein the multi-mode communication unit allocates access for communication using the frequency based communication mode and the time based communication mode based on a scheduling function to optimize capacity usage based on one or more criteria.

20. The system recited in claim 1, wherein the multi-mode communication unit allocates access for communication using the frequency based communication mode and the time based communication mode based on a scheduling function, and wherein the scheduling function includes one or more of the following: proportional fairness, round robin, maximum throughput, time multiplex function, a spatial multiplex function, a time reuse function, and a frequency reuse function.

21. The system recited in claim 1, wherein the multi-mode communication unit allocates access for communication using the frequency based communication mode and the time based communication mode using at least two frequency bands, wherein the at least two frequency bands are overlapping, and wherein a first frequency band can be a subset and/or a superset of a second frequency band.

22. The system recited in claim 1, wherein the system is a multi-mode device, wherein the multi-mode device is selected from one or more of the following: a terminal, a base station, and a repeater.

23. The system recited in claim 1, wherein the system is a multi-mode device, wherein the multi-mode device is a terminal, and wherein the terminal is selected from one or more of the following: a mobile phone, UE, Datacard, broadcast receiver, and broadcast transmitter.

24. The system recited in claim 1, wherein the system is a multi-mode device, wherein the multi-mode device communicates with other multi-mode devices in a peer-to-peer wireless communication network, wireless backhaul, or relay using time division duplexing (TDD) frames.

25. The system recited in claim 1, wherein the system is a multi-mode device, wherein the multi-mode device is a base station, wherein the base station is selected from one or more of the following: a cellular base station, a microcell base station, a Microcell base station, a Pico cell base station, a Femto cell base station, an Access Point (AP), a Set Top Box (STB), a Home Gateway, a Hot Spot Device, a User Terminal, a repeater, a relay, and a WiFi.

26. The system recited in claim 1, wherein the system includes a repeater, and wherein the repeater operates as a terminal and as a base station.

27. The system recited in claim 1, wherein the multi-mode communication unit communicates using a protocol, and wherein the protocol includes one or more of the following: LTE, WiMax, HSPA, CDMA2000/1xEVDO, TD-SCDMA, and WiFi.

28. The system recited in claim 1, wherein a wireless backhaul subframe or a wireless peer-to-peer subframe is located directly adjacent to the TDD DL subframe.

29. A system, comprising:
a processor comprising:
a multi-mode communication unit, wherein the multi-mode communication unit allocates access for a time based communication mode and a frequency based communication mode;
a first RF/analog front end, wherein the multi-mode communication unit using the time based communication mode is provided at least in part using the first RF/analog front end;
a second RF/analog front end, wherein the multi-mode communication unit using the frequency based communication mode is provided at least in part using the second RF/analog front end; and
a communication interface coupled to the processor and configured to provide the communication interface with instructions,
wherein the multi-mode communication unit allocates access for communication by operating a TDD Downlink (TDD DL) communication mode and a TDD Uplink (TDD UL) communication mode using a first carrier frequency, and one of a FDD Uplink (FDD UL) and a FDD Downlink (FDD DL) using a second carrier frequency;
wherein a guard band subframe, using the first carrier frequency, is between a TDD DL subframe and a TDD UL subframe; and
wherein the multi-mode communication unit allocates access for communication by operating the TDD Downlink (TDD DL) communication mode and the TDD Uplink (TDD UL) communication mode in an FDD Downlink (FDD DL) carrier frequency, using the first carrier frequency for FDD DL and TDD DL/UL, and using the second carrier frequency for FDD Uplink (FDD UL), and wherein within the first carrier frequency, using a TDM frame structure to separate FDD DL communications from TDD DL and TDD UL communications.

30. A method, comprising:
executing a multi-mode communication unit, wherein the multi-mode communication unit allocates access for a time based communication mode and a frequency based communication mode, and wherein the multi-mode communication unit allocates access for communication using the time based communication mode and the frequency based communication mode based on a scheduling function to coordinate transmissions using a shared RF front end;

executing a first RF/analog front end, wherein the multi-mode communication unit using the time based communication mode is provided at least in part using the first RF/analog front end;

executing a second RF/analog front end, wherein the multi-mode communication unit using the frequency based communication mode is provided at least in part using the second RF/analog front end; and executing radio resource manager, wherein the radio resource manager performs at least in part the allocation of access to the shared RF front end for communication using the time based communication mode and the frequency based communication mode, wherein the multi-mode communication unit allocates access for communication by operating a TDD Downlink (TDD DL) communication mode and a TDD Uplink (TDD UL) communication mode using a first carrier frequency, and one of a FDD Uplink (FDD UL) and a FDD Downlink (FDD DL) using a second carrier frequency;

wherein a guard band subframe, using the first carrier frequency, is between a TDD DL subframe and a TDD UL subframe; and wherein the multi-mode communication unit allocates access for communication by operating the TDD Downlink (TDD DL) communication mode and the TDD Uplink (TDD UL) communication mode in an FDD Downlink (FDD DL) carrier frequency, using the first carrier frequency for FDD DL and TDD DL/UL, and using the second carrier frequency for FDD Uplink (FDD UL), and wherein within the first carrier frequency, using a TDM frame structure to separate FDD DL communications from TDD DL and TDD UL communications.

31. A computer program product, the computer program product being embodied in a non-transitory computer readable storage medium and comprising computer instructions for:

executing a multi-mode communication unit, wherein the multi-mode communication unit allocates access for a time based communication mode and a frequency based communication mode;

executing a first RF/analog front end, wherein the multi-mode communication unit using the time based communication mode is provided at least in part using the first RF/analog front end;

executing a second RF/analog front end, wherein the multi-mode communication unit using the frequency based communication mode is provided at least in part using the second RF/analog front end; and executing radio resource manager, wherein the radio resource manager performs at least in part the allocation of access for communication using the time based communication mode and the frequency based communication mode, wherein the multi-mode communication unit allocates access for communication by operating a TDD Downlink (TDD DL) communication mode and a TDD Uplink (TDD UL) communication mode using a first carrier frequency, and one of a FDD Uplink (FDD UL) and a FDD Downlink (FDD DL) using a second carrier frequency;

wherein a guard band subframe, using the first carrier frequency, is between a TDD DL subframe and a TDD UL subframe; and wherein the multi-mode communication unit allocates access for communication by operating the TDD Downlink (TDD DL) communication mode and the TDD Uplink (TDD UL) communication mode in an FDD Downlink (FDD DL) carrier frequency, using the first carrier frequency for FDD DL and TDD DL/UL, and using the second carrier frequency for FDD Uplink (FDD UL), and wherein within the first carrier frequency, using a TDM frame structure to separate FDD DL communications from TDD DL and TDD UL communications.

* * * * *